United States Patent
Fujita et al.

(10) Patent No.: US 7,690,678 B2
(45) Date of Patent: Apr. 6, 2010

(54) AIR BAG DEVICE

(75) Inventors: Keiichiro Fujita, Atsugi (JP); Tsutomu Koizumi, Atsugi (JP); Takayuki Hisajima, Atsugi (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/989,371

(22) PCT Filed: Jul. 24, 2006

(86) PCT No.: PCT/JP2006/315066

§ 371 (c)(1),
(2), (4) Date: Nov. 10, 2008

(87) PCT Pub. No.: WO2007/013632

PCT Pub. Date: Feb. 1, 2007

(65) Prior Publication Data

US 2009/0121463 A1 May 14, 2009

(30) Foreign Application Priority Data

Jul. 28, 2005 (JP) .............................. 2005-218999

(51) Int. Cl.
*B60R 21/16* (2006.01)
(52) U.S. Cl. ..................................... 280/731
(58) Field of Classification Search .................. 280/731
See application file for complete search history.

(56) References Cited

U.S. PATENT DOCUMENTS 6,719,323 B2 * 4/2004 Kai et al. .................... 280/731

(Continued)

FOREIGN PATENT DOCUMENTS

JP 2001-206184 A 7/2001

(Continued)

OTHER PUBLICATIONS

Supplemental European Search Report for EP 06 76 8375, EPO, The Hague, mailed Oct. 19, 2009.

(Continued)

*Primary Examiner*—Faye M. Fleming
(74) *Attorney, Agent, or Firm*—Harness, Dickey & Pierce, P.L.C.

(57) ABSTRACT

A floating type air bag device able to prevent backlash of a module cover and easily position the module cover with respect to a steering wheel without dispersion and a sacrifice of an operation feeling of horn sounding is provided. The air bag device has a retainer (10) to which an inflator and a folded air bag are attached, the retainer (10) being fixed to a steering wheel armature (60) and having a plurality of hooks (13) formed in a side wall portion thereof (12); a module cover (20) in which the module cover covers the air bag and the hook (13) is engaged with an opening (22*b*) of a leg piece portion (22) projected from a rear side and the module cover (20) can be vertically moved with respect to the retainer (10); a horn plate (30) attached along a circumferential edge of the module cover (20); a contact plate (40) attached to an extending-out portion (11) of the retainer (10) or the horn plate (30); and a horn spring (50) arranged between the horn plate (30) and the retainer (10); wherein a first position regulation section (pin) (11*d*) of the retainer (10) to the steering wheel (60) is received by a resin coating portion (62) of the steering wheel armature, and is placed below a second position regulation section (C) formed by the opening (21*a*) of the leg piece portion (21) of the module cover (20) and a pawl (11*c*) extended in the retainer (10).

20 Claims, 4 Drawing Sheets

U.S. PATENT DOCUMENTS

| | | | |
|---|---|---|---|
| 7,185,915 B2 * | 3/2007 | Fujita et al. | 280/731 |
| 2001/0030412 A1 * | 10/2001 | Igawa et al. | 280/728.2 |
| 2004/0004344 A1 * | 1/2004 | Kim et al. | 280/731 |
| 2004/0169358 A1 * | 9/2004 | Fujita et al. | 280/731 |
| 2005/0017484 A1 * | 1/2005 | Worrell et al. | 280/731 |

FOREIGN PATENT DOCUMENTS

| | | | |
|---|---|---|---|
| JP | 2001-278066 A | | 10/2001 |
| JP | 2001-354101 A | | 12/2001 |
| JP | 2002-12115 A | | 1/2002 |
| JP | 2002-114121 A | | 4/2002 |
| JP | 2002-362376 A | | 12/2002 |
| WO | WO 2007013632 A1 | * | 2/2007 |
| WO | WO 2007013635 A1 | * | 2/2007 |

OTHER PUBLICATIONS

English Translation of the International Preliminary Report on Patentability, IB, Geneva, issued Sep. 9, 2008, incorporating the English Translation of the Written Opinion of the ISA, ISA/JP, mailed Aug. 29, 2006.

* cited by examiner (A)

(B)

AIR BAG DEVICE

TECHNICAL FIELD

The present invention relates to an air bag device having a steering horn contact device, and particularly relates to an air bag device in which the steering horn contact device is turned on by moving only a module cover when the module cover is pushed.

BACKGROUND ART

For example, as an air bag device for a driver's seat arranged in a steering wheel of an automobile, FIG. 29 of Japanese Patent Laid-Open No. 2001-206184 discloses a so-called floating type air bag device in which the steering horn contact device is turned on and a horn is sounded when the module cover is pushed.

The floating type air bag device is constructed such that no entire air bag device is operated but only the module cover is operated. Accordingly, pressing force required to turn on the steering horn contact device is reduced and a driver can sound the horn by only lightly pushing the module cover.

DISCLOSURE OF THE INVENTION

However, in the module cover of the floating type air bag device, backlash is easily caused with respect to the steering wheel, and it is not easy to position the module cover with respect to the steering wheel without backlash.

The present invention solves the above problem, and its object is to provide a floating type air bag device able to prevent the backlash of the module cover and easily position the module cover with respect to the steering wheel without dispersion and a sacrifice of an operation feeling of the horn sounding.

Therefore, the air bag device of the present invention comprises a retainer to which an inflator and a folded air bag are attached, the retainer being fixed to a steering wheel armature and having a plurality of hooks formed in a side wall portion thereof; a module cover in which the module cover covers the air bag and the hook is engaged with an opening of a leg piece portion projected from a rear side and the module cover can be vertically moved with respect to the retainer; a horn plate attached along a circumferential edge of the module cover; a contact plate attached to the retainer or the horn plate; and a horn spring arranged between the horn plate and the retainer; wherein a first position regulation section of the retainer to the steering wheel is received by a resin coating portion of the steering wheel armature, and is placed below a second position regulation section formed by the opening of the leg piece portion of the module cover and a pawl extended in the retainer.

Further, it is preferable that a vertical wall around the opening of the leg piece portion of the module cover and a part of the pawl of the retainer opposed to the vertical wall relatively have an inclination having a distance gradually increased with respect to a movable direction of the module cover.

Since the air bag device of the present invention has the above construction, the retainer can be accurately positioned without having an influence due to dispersion of other parts such as a steering wheel armature, and the like. Further, a positioning distance of each part can be shortened and the influence due to the dispersion of the part can be reduced by arranging the first position regulation section just below the second position regulation section.

BEST MODE FOR CARRYING OUT THE INVENTION

One example of an embodiment of the present invention will be explained in detail with reference to the drawings.

Figure 1:
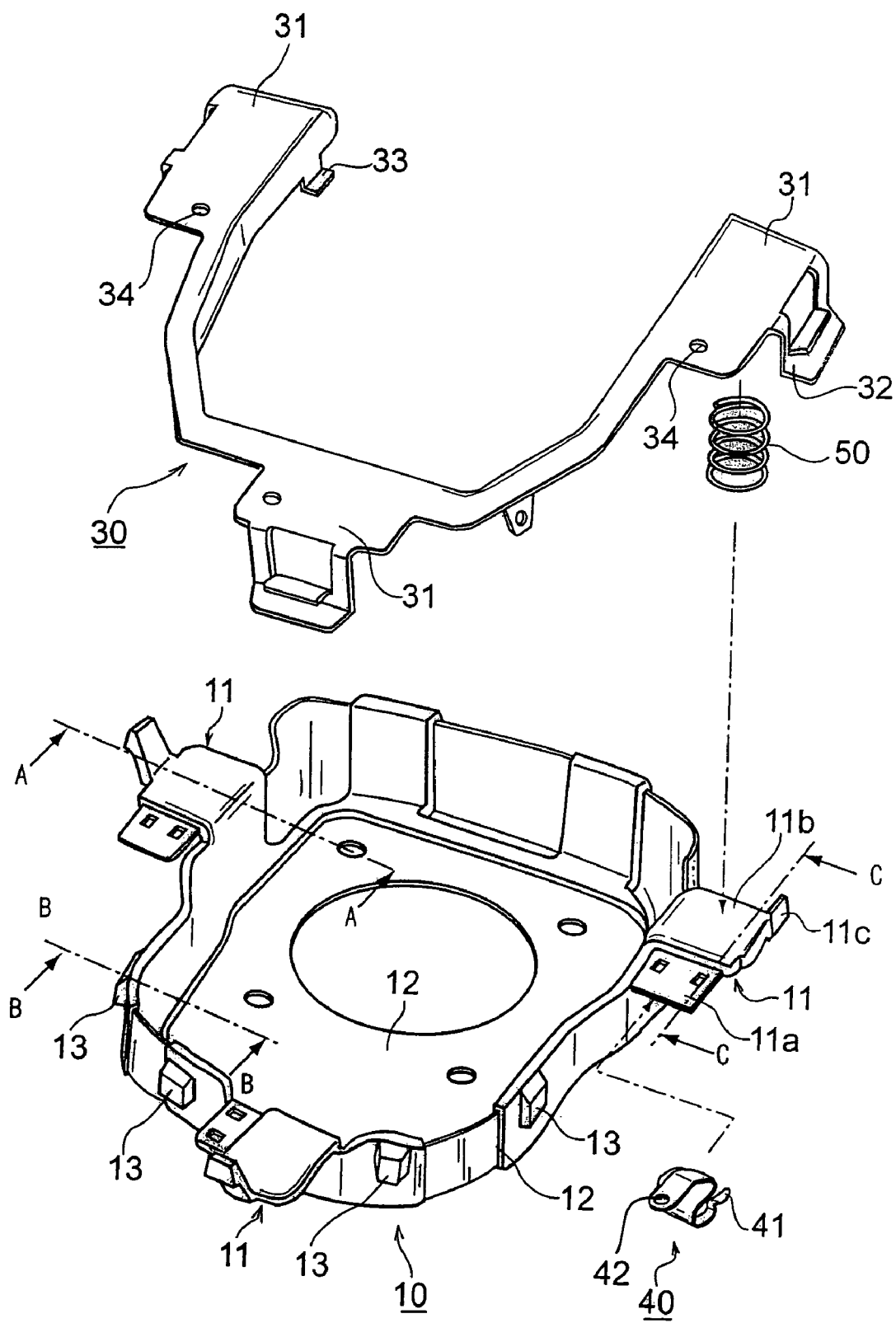
FIG. 1 is a perspective view showing the relation of a horn plate and a retainer of an air bag device in accordance with an embodiment of the present invention.
Figure 2:
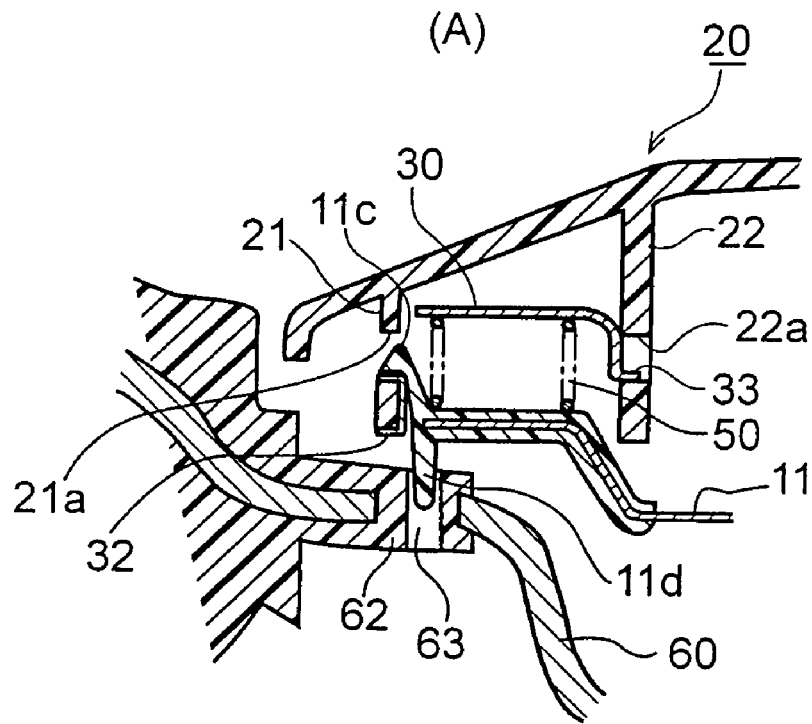
FIG. 2(A) is an A-A sectional view of FIG. 1.
FIG. 2(B) is an enlarged view of a main portion of FIG. 2(A).
Figure 2:
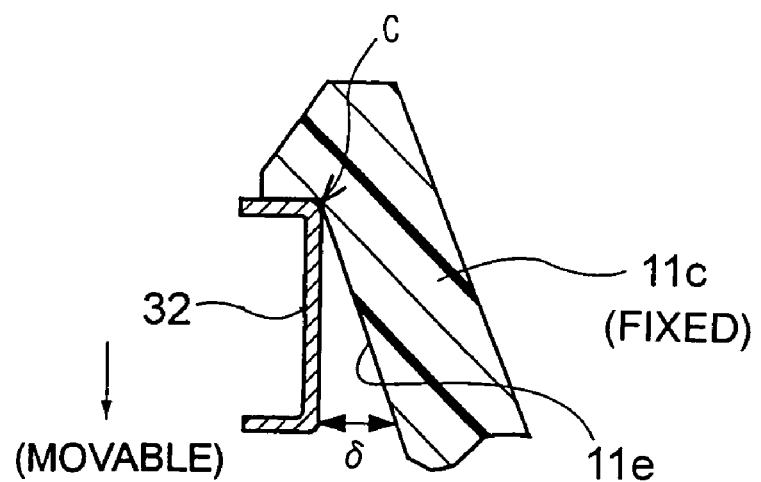
Figure 3:
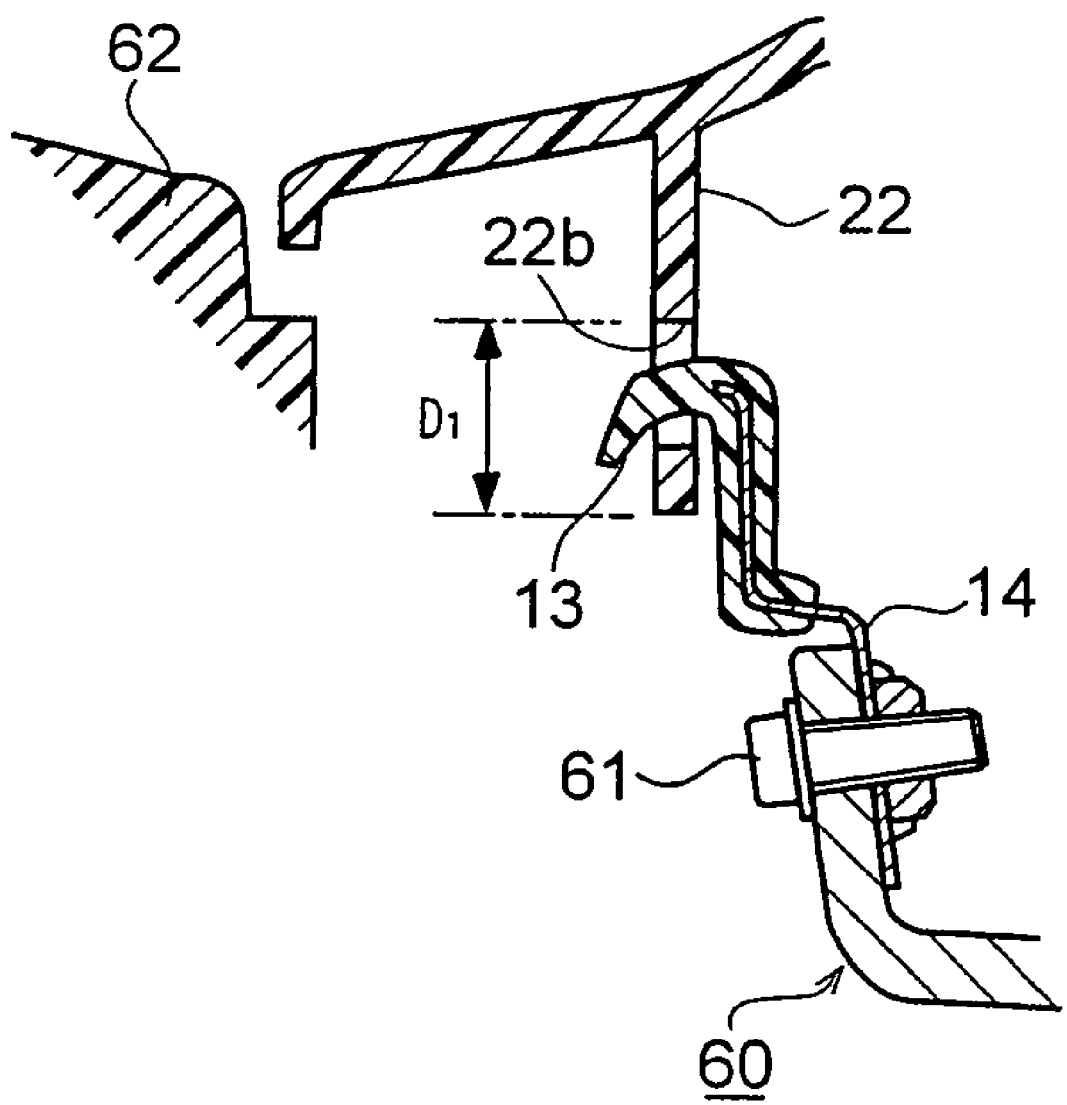
FIG. 3 is a B-B sectional view of FIG. 1.
Figure 4:
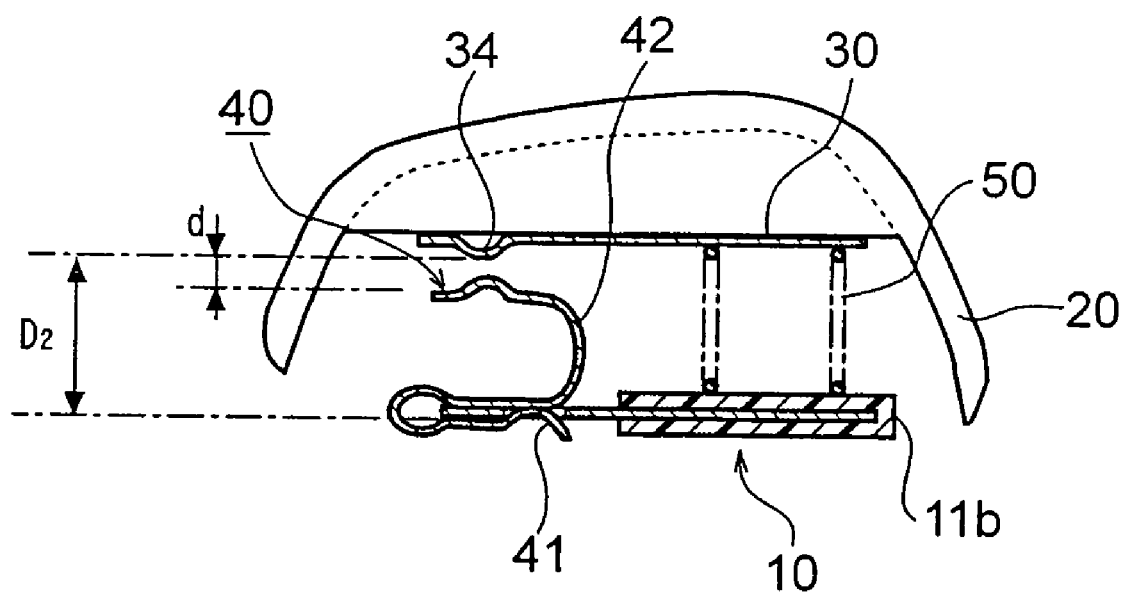
FIG. 4 is a C-C sectional view of FIG. 1.

FIG. 1 is a perspective view showing the relation of a horn plate and a retainer of an air bag device in accordance with the embodiment of the present invention. FIG. 2(A) is an A-A sectional view of FIG. 1, and FIG. 2(B) is an enlarged view of a main portion of FIG. 2(A). FIG. 3 is a B-B sectional view of FIG. 1. FIG. 4 is a C-C sectional view of FIG. 1.

The air bag device having a steering horn contact device is constructed by arranging a retainer 10 attaching an inflator and a folded air bag thereto, a module cover 20 covering the above air bag, a horn plate 30 attached to the above module cover 20, a contact plate 40 attached to an extending-out portion 11 of the above retainer 10, and a horn spring 50 arranged between the above horn plate 30 and the extending-out portion 11 of the above retainer 10.

An outside leg piece portion 21 and an inside leg piece portion 22 are projected from a rear face of the above module cover 20. Further, the above horn plate 30 approximately has a U-shape seen from a plane, and contact portions 31 with the above contact plate 40 are formed in three places.

This contact portion 31 has an outside fitting piece 32 fitted to an opening 21a of the above outside leg piece portion 21 and a contact 34 abutting on the above contact plate 40. An inside bending piece 33 may be arranged in the contact portion 31 of the horn plate 30, and may be also engaged with an opening 22a of the inside leg piece portion 22 of the module cover 20 as one example of a means for fixing the horn plate 30 to the module cover 20. Further, a rib thin in wall thickness may be arranged in a part of the module cover 20 abutting on the horn plate 30 and may be also engaged so as to push-in the horn plate 30 although this rib is not particularly illustrated in the drawings.

The above horn plate 30 is attached along a circumferential edge of the above module cover 20, and the above outside fitting piece 32 approximately formed in the U-shape in section is fitted to the opening 21a of the outside leg piece portion 21 of the above module cover 20. Further, the above inside bending piece 33 is attached to the opening 22a of the above inside leg piece portion 22. Thus, at a horn operating time, the above horn plate 30 is moved integrally with the above module cover 20.

The above unillustrated inflator and the above unillustrated air bag are attached to a bottom face portion 12 of the above retainer 10. The above contact plate 40 is fixed to the extending-out portion 11 formed so as to be extended out to a side wall portion 12 in three places. Further, a plurality of hooks 13 formed in the side wall portion 12 are engaged with an opening 22b of the above inside leg piece portion 22. Further, a projecting piece 14 projected downward from the rear face of the above retainer 10 is fixed to a steering wheel armature 60 by a bolt 61.

The above extending-out portion 11 is constructed by a metallic portion 11a attaching the above contact plate 40 thereto, and an insulating portion 11b placing the above horn spring 50 thereon. The above insulating portion 11b is a portion formed by injection-molding resin so as to cover a part of the above metallic portion 11a, which is formed so as to be extended out to the above side wall portion 12. The insulating portion 11b is constructed by a pawl 11c abutting on the above outside fitting piece 21, and a pin 11d inserted into a guide hole 63 formed in a resin coating portion 62 of the steering wheel armature 60.

The above contact plate 40 is constructed by a clip portion 41 for nipping and fastening the above metallic portion 11a, and a leaf spring portion 42 abutting on the contact 34 of the above horn plate 30 during the horn operation. For example, the above contact plate 40 is preferably manufactured by a phosphor bronze plate.

When the module cover 20 and the retainer 10 are assembled, it is necessary that the hook 13 formed in the side wall portion 12 is reliably engaged with the opening 22b of the inside leg piece portion 22. However, it is therefore necessary to push-in the retainer 10 on the module cover 20 side as much as possible (pushing-in amount: D1). However, when the contact plate 40 is already fixed to the retainer 10, it is impossible to push-in the retainer 10 by a clearance d (<D1) or more between the contact 34 of the horn plate 30 and the contact of the contact plate 40. This is because the contact plate 40 already fixed hits against the horn plate 30.

However, when the horn plate 30 is assembled into the module cover 20 and the retainer 10 is then assembled and the above clip portion 41 of the contact plate 40 is finally nipped and fastened in the above metallic portion 11a of the retainer 10 as in this embodiment, pushing-in (D2≧D1) of the above clearance d or more can be performed in assembling the module cover 20 and the retainer 10, and the retainer 10 is easily assembled and working efficiency is improved.

Next, a position regulating device of the steering wheel and the air bag device will be explained in detail. In a standard state, backlash of the air bag device is prevented since a corner C of the pawl 11c of the extending-out portion 11 of the above retainer 10 is arranged so as to abut against a corner of the above outside fitting piece 32 approximately having a U-shape in section in the above horn plate 30 by the action of spring force of the above horn spring 50.

Further, at the horn operating time, the above pawl 11c is not moved, but the above outside fitting piece 32 is moved in a downward direction together with the module cover 20. Accordingly, a clearance 6 is formed between the pawl 11c and the above outside fitting piece 32 by a taper portion 11e of the above pawl 11c, and malfunction in the operation of the module cover 20 (skew, engagement and the like) is prevented. Here, the taper portion 11e is a vertical wall around the opening 21a of the leg piece portion 21 of the above module cover 20, and a part of the above pawl 11c of the above retainer 10 opposed to the above vertical wall. This taper portion 11e relatively has an inclination having a distance gradually increased with respect to a movable direction of the above module cover 20.

Further, the pin 11d (← a first position regulation section of the retainer to the steering wheel) of the extending-out portion 11 of the above retainer is received by a guide hole 63 formed in the above resin coating portion 62, i.e., a direct resin (e.g., urethane) molding portion so that the retainer 10 can be accurately positioned without having an influence due to dispersion of other parts such as the steering wheel armature 60, and the like.

The pin 11d (← the first position regulation section of the retainer to the steering wheel) of the above retainer 10 is arranged below the corner C (← a second position regulation section formed by the opening of the leg piece portion of the module cover and the pawl extended in the retainer) of the above pawl 11c. Thus, it is possible to shorten a positioning distance of each part, and reduce an influence due to dispersion of the part.

The distance f between an axis of the above pin 11d and the corner C of the above pawl 11c is preferably set to about twice (f≈2a) the diameter a of the above guide hole 63.

The invention claimed is:

1. An air bag device comprising:
    a retainer for receiving an inflator and a folded air bag, the retainer being fixed to a steering wheel armature and having at least one hook formed in a side wall portion thereof;
    a module cover including first and second leg pieces projecting from a rear side, the first leg piece with a first opening and the second leg piece with a second opening, the module cover covering said air bag and said at least one hook being engaged with the first opening of the first leg piece such that the module cover can be vertically moved with respect to said retainer;
    a horn plate attached along a circumferential edge of said module cover;
    a contact plate attached to said retainer or said horn plate; and
    a horn spring arranged between said horn plate and said retainer;
    wherein a first position regulation section of said retainer to said steering wheel is received by a resin coating portion of said steering wheel armature, and is placed below a second position regulation section formed by the second opening of the second leg piece of said module cover and a pawl extended in said retainer.

2. The air bag device according to claim 1, wherein a vertical wall around the second opening of the second leg piece of said module cover and a part of said pawl of said retainer opposed to said vertical wall relatively have an inclination having a distance gradually increased with respect to a movable direction of said module cover.

3. An airbag device comprising:
    a retainer (10) for receiving an inflator and a folded air bag, the retainer being fixed relative to a steering wheel armature;
    a module cover (20) for covering the air bag and coupled to the retainer for vertical movement with respect thereto, the module cover including a first rearwardly extending leg defining a first opening;
    a horn plate (30) attached along a circumferential edge of the module cover; and
    a laterally extending portion (11) carried by the retainer including a downwardly extending regulation portion (11d) received by the steering wheel armature and an upwardly extending regulation portion (11c) for engaging the first opening of the first leg.

4. The air bag device of claim 3, wherein the downwardly extending regulation portion is a pin received within an opening of the steering wheel armature for vertical movement relative thereto.

5. The air bag device of claim 3, wherein the upwardly extending regulation portion is a pawl extending into the first opening.

6. The air bag device of claim 3, further comprising a horn plate attached along a circumferential edge of the module cover.

7. The air bag device of claim 6, further comprising a contact plate attached to the one of the retainer and the horn plate.

8. The air bag device of claim 6, further comprising a horn spring arranged between the horn plate and the retainer.

9. The air bag device of claim 3, wherein the module cover further includes a second rearwardly extending leg defining a second opening (22b) receiving a hook (13) formed in a sidewall portion of the retainer.

10. The air bag device of claim 6, wherein the module cover further includes a second rearwardly extending leg defining a second opening (22a) receiving a tab (33) extending from the horn plate.

11. The air bag device of claim 6, wherein the module cover includes a second rearwardly extending leg defining a second opening (22b) and a third opening (22a), the second opening receiving a hook formed in a sidewall portion of the retainer, the third opening receiving a tab extending from the horn plate.

12. An air bag device comprising:
a retainer for receiving an inflator and a folded air bag, the retainer being fixed relative to a steering wheel armature, the retainer including a laterally extending portion;
a module cover including a first rearwardly extending leg (21) and a second rearwardly extending leg (22), the module cover coupled to the retainer for vertical movement with respect thereto; and
a horn plate disposed between the retainer and the module cover, the horn plate including a portion located within an area bounded by the module cover, the first and second legs of the module cover and the laterally extending portion of the retainer.

13. The air bag device of claim 12, wherein the first leg defines a first opening receiving a first retention feature of the laterally extending portion.

14. The air bag device of claim 13, further comprising a horn spring disposed between the module cover and the retainer, the horn spring disposed in the area bounded by the module cover, the first and second legs of the module cover and the laterally extending portion of the retainer.

15. The air bag device of claim 13, wherein the second leg defines a second opening (22b) receiving a hook (13) formed in a sidewall portion of the retainer.

16. The air bag device of claim 13, wherein the second leg defines a second opening (22a) receiving a tab (33) extending from the horn plate.

17. The air bag device of claim 13, wherein the laterally extending portion of the retainer includes an upwardly extending element defining the first retention feature.

18. The air bag device of claim 13, wherein the laterally extending portion further includes a second retainer feature received within an opening of the steering wheel armature.

19. The air bag device of claim 18, wherein the second retention feature is a pin received in the opening of the steering wheel armature for vertical movement relative thereto.

20. The air bag device of claim 12, wherein the laterally extending portion of the retainer includes an upwardly extending pawl engaged with a first opening of the first leg and a downwardly extending pin received for vertical movement in an opening defined by the steering wheel aperture.

* * * * *